May 3, 1960

M. S. DELAY 2,935,332

TRUCK TRAILER WITH SHIFTABLE RUNNING GEAR FOR LOAD EQUALIZING

Filed Aug. 30, 1956

INVENTOR.
MANFORD S. DELAY
BY
ATTORNEY

May 3, 1960

M. S. DELAY 2,935,332

TRUCK TRAILER WITH SHIFTABLE RUNNING GEAR FOR LOAD EQUALIZING

Filed Aug. 30, 1956

INVENTOR.
MANFORD S. DELAY
BY
ATTORNEY

May 3, 1960

M. S. DELAY 2,935,332

TRUCK TRAILER WITH SHIFTABLE RUNNING
GEAR FOR LOAD EQUALIZING

Filed Aug. 30, 1956

*INVENTOR.*
MANFORD S. DELAY
BY

ATTORNEY

United States Patent Office 2,935,332
Patented May 3, 1960

2,935,332

TRUCK TRAILER WITH SHIFTABLE RUNNING GEAR FOR LOAD EQUALIZING

Manford S. De Lay, St. Louis, Mo.

Application August 30, 1956, Serial No. 607,014

3 Claims. (Cl. 280—81)

This invention pertains to a means for adjusting the position of the rear wheels of a trailer in order to equalize the load on the wheels.

An object of this invention is to provide a locking means of simple construction whereby the wheel truck may be locked to the trailer body in different adjusted positions, and which provide a strong and secure lock for that purpose.

Another object is to provide means for releasing the lock and for automatically reengaging the same when the wheel truck and the body have been moved to a predetermined relative position.

Another object is to provide such locking means having a plurality of locking elements arranged to act simultaneously when in locking position but to provide lost-motion connections whereby each element may move to a locking position independently of the others.

Generally stated, the invention comprises a plurality of locking pins movably mounted on the wheel truck for engagement and disengagement with a series of sockets spaced along the side rails of the trailer body. Mechanism is provided for simultaneously retracting all of the pins from engagement with said sockets. The retracting means are provided with a latch to hold the same in retracting position. A cam is mounted on one of said rails for adjustment thereon to any one of a series of definite positions. This cam may be set at a point corresponding to the point along said rails at which the locking pins are to be released. With the cam so set, the driver moves the trailer body forward or backward whereupon said cam engages and releases said latch. This frees the locking pins for movement into engagement with their sockets as soon as said sockets move into alignment with the pins. Lost-motion connections to the pins permit each one to move into its socket as soon as it becomes aligned therewith and independently of the other pins.

A preferred embodiment of this invention is illustrated in the accompanying drawings in which.

Figure 1:
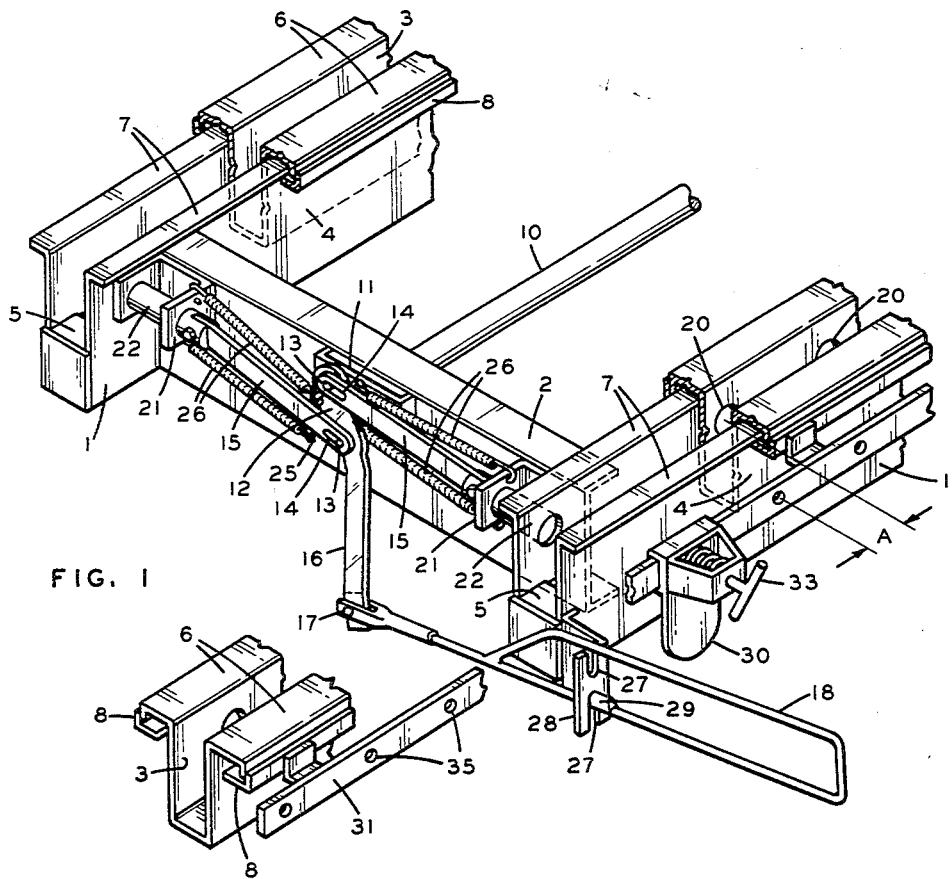
Fig. 1 is a fragmentary perspective view of a part of the wheel truck frame together with parts of the side rails of the trailer body.
Figure 2:
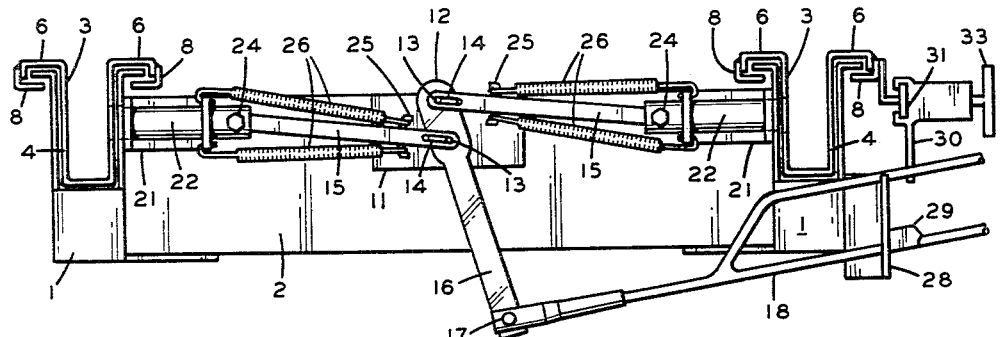
Fig. 2 is an end view of the same structure as seen from the left of Fig. 1.

Referring to the drawing, the wheel truck frame consists of a pair of side channel members 1 framed together by cross braces 2 usually of channel form. The frame, consisting of members 1 and 2, is suitably mounted on road wheels in any suitable manner. Said wheels are not shown in the drawing. The trailer body may have any suitable frame including a pair of channel shaped side rails 3. These rails are formed with a U-shaped middle portion 4 which fits between the side flanges of channel 1 so as to be slidable there along. The bottoms of the channels 1 may be provided with any suitable type of bearing elements 5 adapted to slidably support the U portions 4 of the side rails. The upper portions of the rails 3 are bent outward to form flanges 6 extending over the top of similar flanges 7 on the channels 1. In the embodiment illustrated, angle irons 8 are welded to the outside edges of the flanges 6 in such a manner that one of the flanges of the angle 8 extends below the flange 7 of the channel 1. This provides an interlock to keep the channels 3 from becoming entirely separated from the channels 1 during adjustment. The truck frame has mounted thereon at each end thereof on one of the cross channels 2 a locking mechanism as illustrated in Fig. 1. As these mechanisms are identical at the two ends of the frame, only one of them need be described. A shaft 10 extends longitudinally of the truck frame and is journalled at its ends in the channels 2 and brackets 11 mounted one on each of said cross channels 2. Secured to the end of the shaft 10 so as to extend transversely thereof is a lever for crank member 12. The member 12 caries two crank pins 13 equally spaced on opposite sides of the axis of the shaft 10. Connected to each pin 13 by means of a slot 14 in which the pin is movable is a link 15. The crank member 12 has a downward extension 16 pivotally connected at 17 to an operating handle 18. Accordingly, by moving the handle 18 to the right or left in Fig. 1 the crank 12 may be rocked back and forth. This movement rocks the shaft 10 which imposes a similar movement on a similar crank member attached to the other end of the shaft.

The inner flange of the U portion 4 of each of the rails 3 is provided with a series of perforations 20 uniformly spaced there along. Mounted at each end of the channel member 2 is a U shaped bracket 21, the legs of which are perforated to receive a locking pin 22 slidable therein. The flange of the channel member 1 opposite the bracket 21 is also perforated in alignment with the pin 22 so as to permit said pin to pass there through. The inner end of the pin 22 is provided with a slot 23 adapted to receive the end of one of the links 15 which is pivotally connected to said pin by a pivot bolt 24. Welded or otherwise secured to each of the links 15 is a small bracket formed with a pair of hook members 25 extending beyond the edges of the link 15. Attached to these hook members are tension springs 26, the other ends of which are hooked into perforations in the inner leg of the U shaped bracket 21. These springs acting through the link 15 serve to tension the pin 22 for outward movement so as to enter one of the perforations 20 when said perforation is aligned with the pin. These perforations, therefore, serve as sockets into which the pins 22 enter in order to lock the truck frame to the rails 3. The slots 14 provide lost motion between the links 15 and the pins 13 so that in case all of the pins do not come into alignment with their sockets simultaneously, each one may enter its own socket individually when that socket does come into alignment. As there are four pins 22 a fourfold lock is provided.

In order that the truck frame may be moved relatively to the trailer body or vice versa, the handle 18 by which the lever 16 is operated to retract the pins 22 from their sockets is arranged to pass through slots 27 in a guide plate 28 mounted on one of the channels 1. Said handle 18 is provided with a lug 29 adapted to lodge against the plate 28 when the handle 18 is raised in the slots 27 so that said lug will retain the device in retracted position, as shown in Fig. 1. When in this position the pins 22 are disengaged from their sockets 20 and the trailer body may move relatively to the truck frame.

Figure 3:
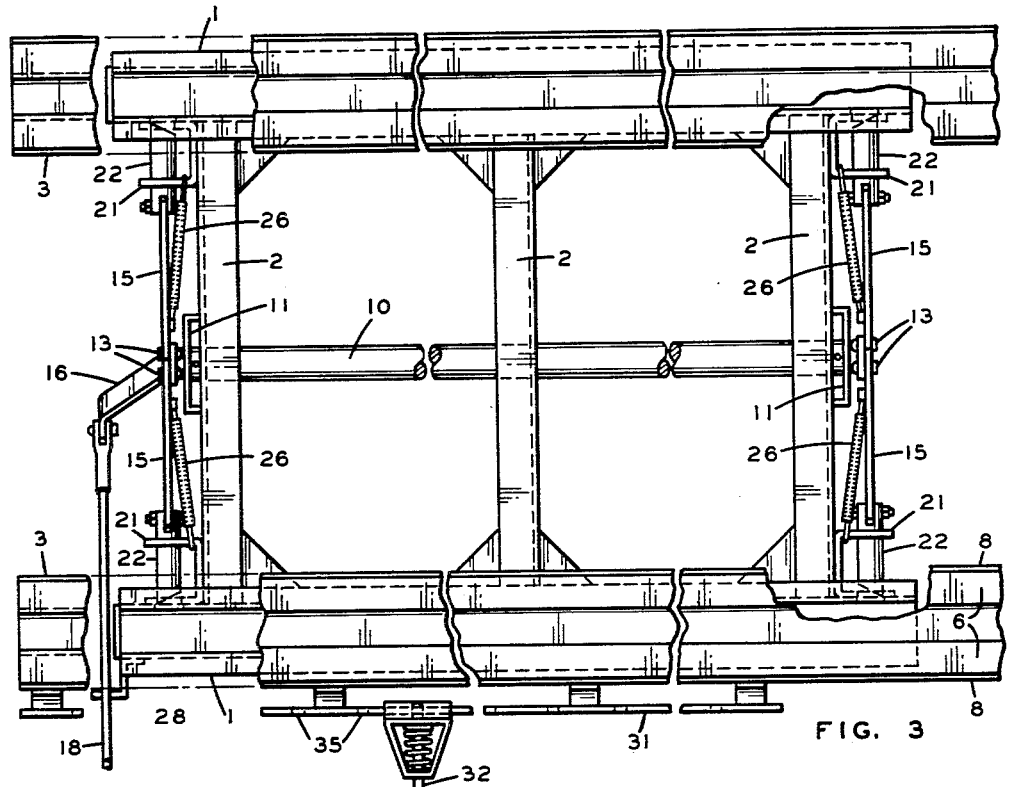
Fig. 3 is a plan view with parts broken away showing the wheel truck frame in its relation to the side rails of the trailer body.
Figure 4:
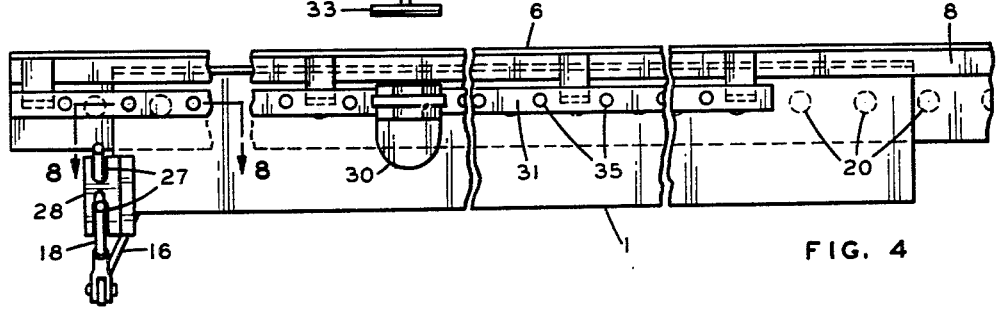
Fig. 4 is a side view as seen from below Fig. 3.
Figure 5:
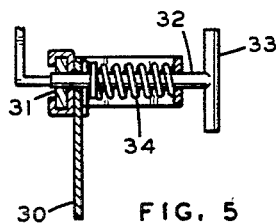
Fig. 5 is a sectional detail of the latch for the tripping cam.

In order to release the pins 22 automatically when the desired adjustment has been obtained, a tripping cam 30 is arranged for adjustment along a rail 31 mounted on the side of one of the rails 3 to extend there along as shown in Figs. 1, 3 and 4. The cam 30 is provided with a latching pin 32 having a handle 33 and biased by a spring 34 to enter any one of a series of perforations 35 in the rail 31. As may be seen from Fig. 1 with the cam 30 set in the position shown, if the trailer is pulled forward so as to move the rails 3 to the left of Fig. 1, the cam 30 will move therewith, and when the desired position of adjustment is reached the lower edge of said cam will engage the upper part of the handle 18 forcing the latter downward so as to disengage the lug 29 from the plate 28. This frees the mechanism so that the springs 26 may act to move the pins 22 outward in order to enter the sockets 20. Accordingly, the operator may move the truck frame to any new position of adjustment by first properly setting the cam 30 along the rail 31, then retracting the pins 22 by pulling the handle 18 outward and engaging the lug 29 with the plate 28. The trailer body may now be moved in the appropriate direction and when the point is reached when the cam 30 engages the handle 18 the latter will be tripped and the pins released for locking the truck in its new position.

Figures 6, 7:
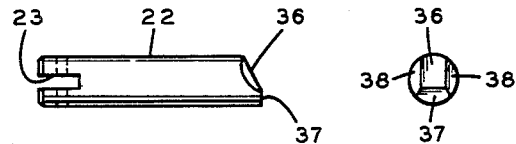
Fig. 6 is a side view of one of the locking pins.
Fig. 7 is an end view of the same.
Figure 8:
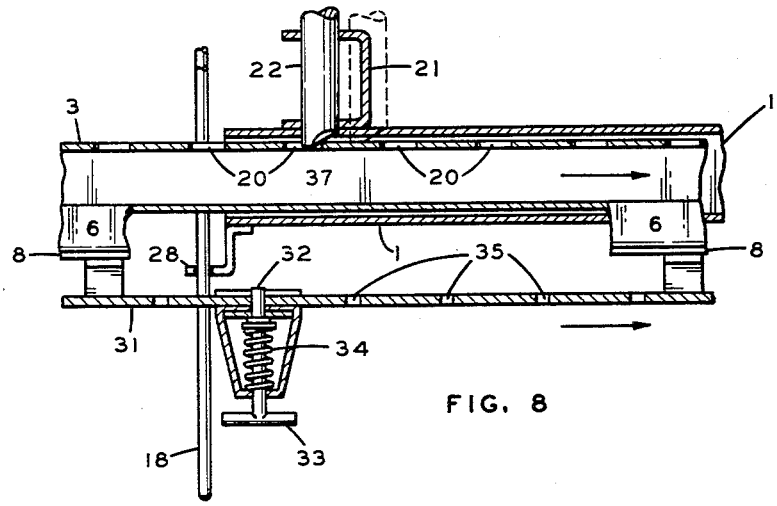
Fig. 8 is a detail section taken on line 8—8 of Fig. 4.

Since it is not always possible to position the socket holes 20 and the pins 22 so accurately that all will engage at the same time, the lost motion connection at the slot 14 permits any pin to be retarded until proper alignment with its socket is obtained. Also, to avoid the possibility of overshooting the positions of the pins, each pin is formed at the end engaging the socket with a beveled face 36 which, as shown in Fig. 6, is positioned at a horizontal angle with a plane normal to the axis of the pin. Preferably a small area of the end of the pin is left perpendicular to the axis as indicated at 37 in Fig. 6 so as to provide a bearing surface when engaging the rail 3. The side portions of this end of the pin may also be beveled off as indicated at 38. This shape of pin facilitates the entrance of the pin into its socket as illustrated in Fig. 8. Preferably the perforations 35 in the cam rail 31 are so located longitudinally with respect to the sockets 20, that is by regulating the distance indicated at A in Fig. 1, so that when the latch 29 is tripped by the cam 30 the pins will engage the rail 13 between two sockets 20 as indicated by the dotted lines in Fig. 8. Since this takes place while the rail 3 is moving in the direction indicated by the arrows in Fig. 8 relatively to the truck frame member 1, said rail 3 will slide along the end of the pin 22 until the next socket 20 comes opposite said pin, at which point the end portion 37 of the pin will easily enter the socket since its cross section is reduced with respect to that of the body of the pin. Accordingly the pin may start to enter the socket before the latter is finally in alignment with the pin, and if the motion is relatively fast it will be stopped by the pin and prevented from overshooting. As shown in Fig. 3 the reduced tips 37 of the locking pins are faced in opposite directions at the two ends of the truck frame so that the pins at one end will prevent overshooting in one direction, while those at the other end will perform the same duty when the movement is in the opposite direction.

It will be seen, therefore, that this invention provides a locking mechanism which requires only simple operations to adjust the trailer for equalizing the load on its wheels. The operator merely has to decide in which direction and how far the body should be shifted on the truck frame, and then set the cam 30 accordingly. Then it is only necessary to retract the locking pins by means of a handle 18, and latch the latter by the lug 29. Then a simple movement of the body by means of the tractor in the required direction will cause the cam 30 to trip the latch 29, whereupon the pins 22 will be forced into engagement with the face of the rail 3, and as the latter moves along, the tips 37 of the two pins at the leading end of the truck frame with respect to the movement of the body, will enter their sockets and check the movement. Then as each socket comes into alignment with its pin, the latter will be moved into engagement therewith by the springs 26. The body is then securely locked to the truck frame and ready for travel.

Various changes may be made in the details of construction, within the scope of the appended claims, without departing from the spirit of this invention. Parts of the invention may be used without the whole and improvements may be added while retaining some or all of the advantages of the invention.

I claim:

1. In a trailer of the character described having a body frame provided with locking-pin sockets spaced therealong and a wheel truck movable along said frame; a locking pin on said truck, resilient means urging said pin toward locking engagement with one of said sockets, manipulating means operable to retract said pin from such engagement, a latch for said manipulating means, means on the truck constraining the manipulating means to a predetermined path of travel into and out of latched position and into and out of the path of said cam means, and cam means adjustably mounted on said body frame, the cam means having opposite side camming margins one of which engages the manipulating means in the latched position upon relative movement of said truck and frame in either direction of movement to release said manipulating means at a predetermined position of said truck relative to said frame.

2. In a trailer of the character described, a body frame including side members provided with locking-pin sockets spaced therealong, a wheel truck movable along said frame, a plurality of locking pins on said truck positioned for simultaneous engagement with a plurality of said sockets, resilient means urging each of said pins toward locking engagement with one of said sockets, manipulating means operable to retract said plurality of said pins from such engagement, a latch for said manipulating means, guide means on the truck constraining the manipulating means to a predetermined path of travel into and out of latched position, and cam means adjustable on said body frame, the cam means having opposite side camming margins one of which engaging the said manipulating means upon relative movement of said truck and frame in either direction of movement to release said manipulating means at a predetermined position of said truck relative to said frame.

3. In a trailer of the character described having a body frame provided with locking-pin sockets spaced therealong and a wheel truck movable along said frame; a locking pin on said truck, resilient means urging said pin toward locking engagement with one of said sockets, manipulating means operable to retract said pin from such engagement, a latch for said manipulating means, cam means adjustable on said frame to a plurality of predetermined positions operating upon movement of said frame relative to said truck to release said manipulating means, said positions being located to effect such release when said pin is between sockets of said frame, and guide means on the truck restraining the manipulating means to a plane of movement substantially at right angles to the path of travel of said cam means, said cam means having opposite side camming margins each of which is adapted to engage the manipulating means when disposed in a latched position, the manipulating means being disposed in latched position in the path of travel of said cam means and being disposed in released position out of said path upon engagement with said cam means incident to relative movement of said frame and truck in either direction.

(References on following page)

References Cited in the file of this patent

UNITED STATES PATENTS

| | | |
|---|---|---|
| 1,812,288 | Drapeau | June 30, 1931 |
| 2,227,764 | Saunders | Jan. 7, 1941 |
| 2,589,678 | De Lay | Mar. 18, 1952 |
| 2,655,981 | Whittingham et al. | Oct. 20, 1953 |
| 2,715,433 | Dolgorukov | Aug. 16, 1955 |
| 2,729,089 | Pelcin | Jan. 3, 1956 |
| 2,818,272 | De Lay | Dec. 31, 1957 |
| 2,831,700 | Sheppard et al. | Apr. 22, 1958 |
| 2,835,504 | Acker | May 20, 1958 |

FOREIGN PATENTS

| | | |
|---|---|---|
| 584,416 | Great Britain | Jan. 14, 1947 |